R. T. KINTZING.
MOTOR CONTROL SYSTEM.
APPLICATION FILED JAN. 30, 1920.
1,360,300.
Patented Nov. 30, 1920.
2 SHEETS—SHEET 1.
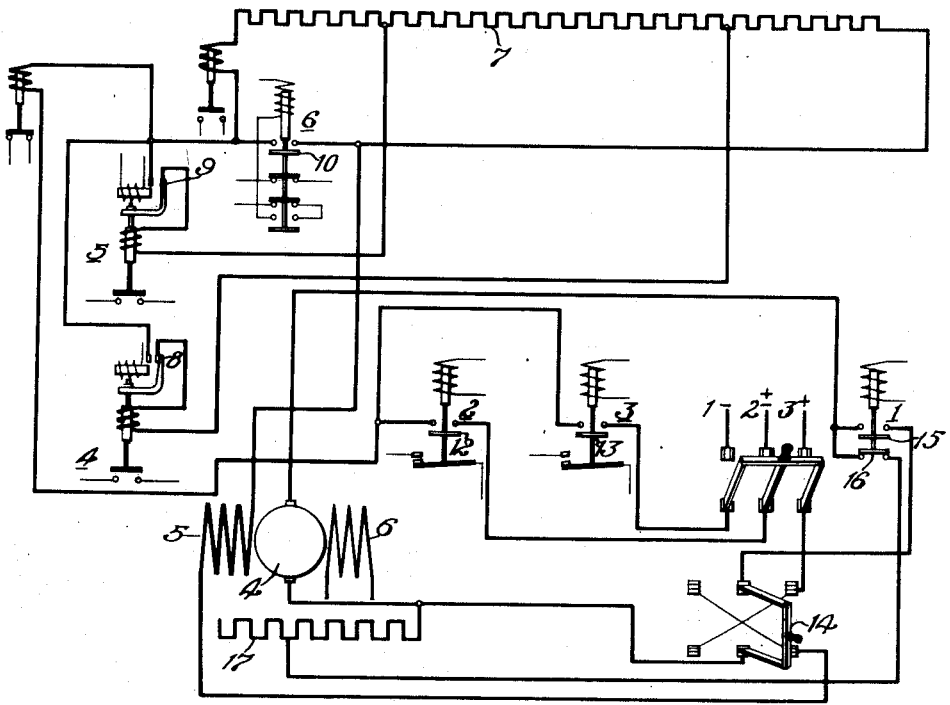
Fig.1
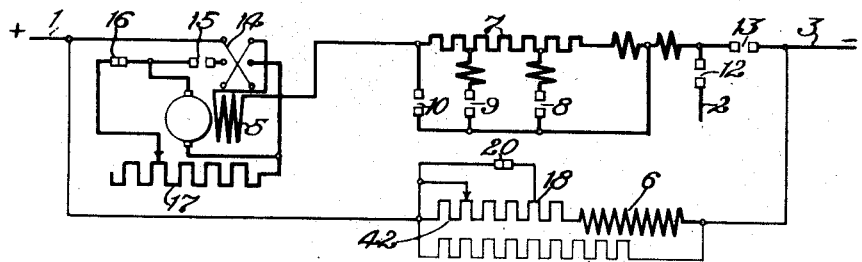
Fig.2.
Fig. 3.
WITNESSES:
J. B. Merrill
Wm. C. McCoy.
INVENTOR
Reese T. Kintzing
BY
Chesley G. Carr
ATTORNEY

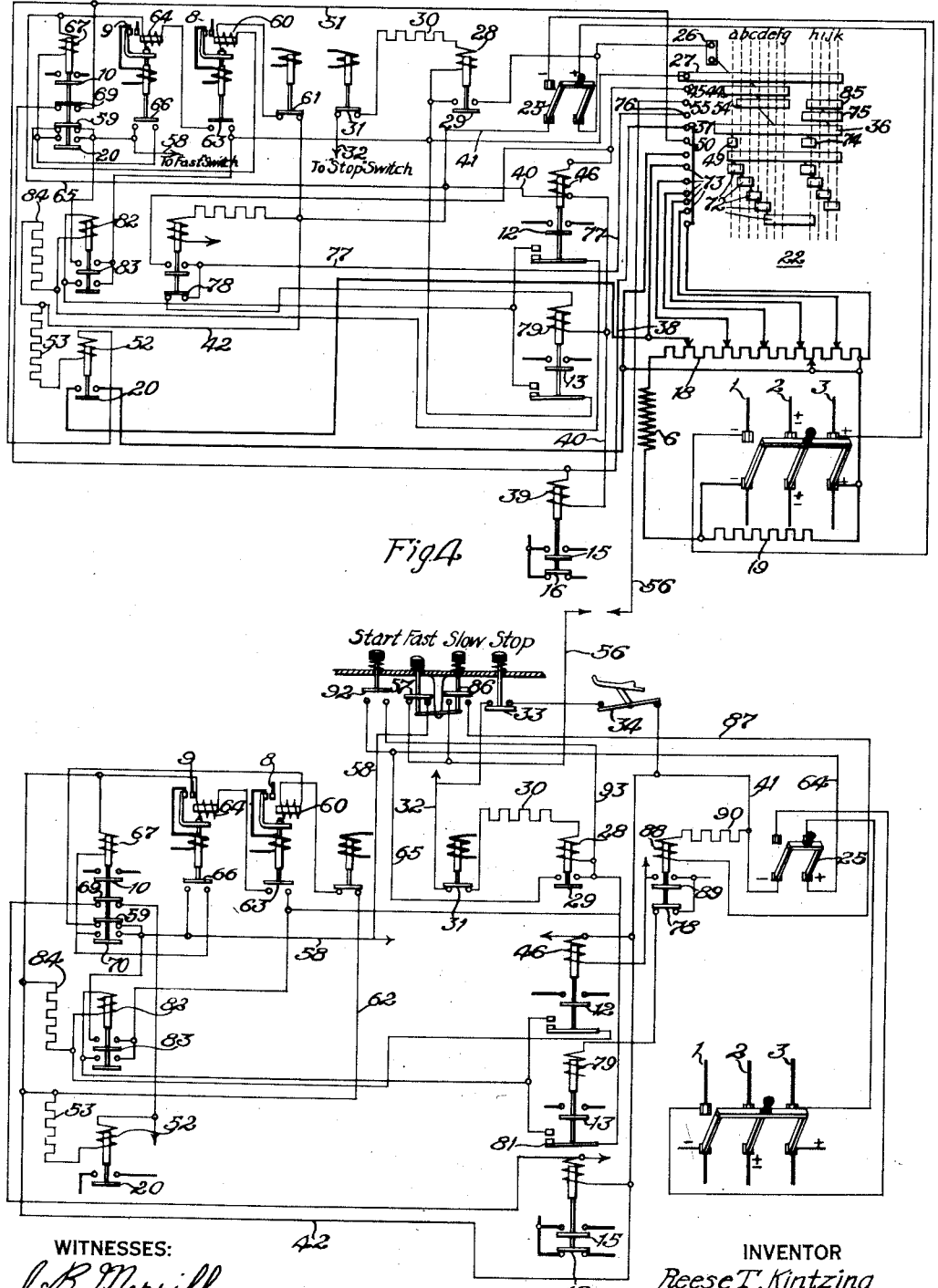

UNITED STATES PATENT OFFICE.

REESE T. KINTZING, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

1,360,300.  Specification of Letters Patent.  Patented Nov. 30, 1920.

Application filed January 30, 1920. Serial No. 355,284.

*To all whom it may concern:*

Be it known that I, REESE T. KINTZING, a citizen of the United States, and a resident of Wilkinsburg, in the county of Allegheny and State of Pennsylvania, have invented a new and useful Improvement in Motor-Control Systems, of which the following is a specification.

My invention relates to motor-control systems and it has particular relation to such systems as are employed in connection with electric motors for driving rubber calenders and similar machines employed in connection with the manufacture of sheet material.

My invention has for its object, to provide a system of the character indicated above by means of which the speeds of electric motors may be easily and quickly varied within desired limits.

In the operation of machines for preparing rubber fabric or other sheet material, it is extremely desirable that the operator shall be able to vary the speed of the motor within comparatively wide limits, within a very short period of time and upon the actuation of simple controlling means. In case of abnormal operation of the machine, it may be necessary to reduce the speed of the driving motor from the maximum operating speed to a very low speed or to bring the motor to rest within a very short period of time in order to prevent damage either to the material or to the rolls of the machine.

In a system of control embodying my invention, the driving motor is controlled by a master switch which effects the acceleration of the motor from rest to normal operating speed by varying the voltage derived from a 3-wire system and applied to the motor, in addition to controlling the usual starting resistor and field resistor. The motor is controlled, also, by a series of push-button switches which operate to vary the speed as desired, to start the motor, if at rest, or to stop the motor, if operating. Upon the actuation of the push-button switch for effecting a reduction in the speed of the motor, the motor may be decelerated from its maximum speed at the higher voltage, to a speed corresponding to full field excitation at the lower voltage without returning the master switch to the corresponding position. In other words, the motor may be controlled by either the master switch or the push-button switches entirely independently of each other.

In the accompanying drawings, Figure 1 is a diagrammatic view of the main circuits and the controlling switches therefor of a system embodying my invention; Fig. 2 is a schematic arrangement of the circuits and apparatus of the system of Fig. 1; Fig. 3 is a sequence chart indicating the sequence of operation of the several controlling switches; Fig. 4 is a diagrammatic view of the circuits controlled by the master switch and the apparatus associated therewith; Fig. 5 is a view similar to Fig. 4 of the circuits controlled by the push-button switches.

Referring particularly to Figs. 1 and 2, line conductors 1, 2 and 3, which may be connected to any suitable 3-wire system, supply energy to an electric motor, the armature of which is indicated at 4 and which has a series field-magnet winding 5 and a shunt field-magnet winding 6. A starting resistor 7 is controlled by accelerating switches 8, 9 and 10. The connection of the motor to line conductors 2 and 3 is controlled by switches 12 and 13, respectively.

The armature circuit of the motor is controlled by a reversing switch 14 and an electro-responsive switch 15. A switch 16, which is mechanically interlocked with the switch 15, controls a dynamic-braking circuit for the motor which comprises a braking resistor 17. The field circuit of the motor, which comprises resistors 18 and 19, is controlled by a relay 20.

Reference may now be had to Fig. 4, in which similar numerals are employed to designate corresponding parts. A master switch 22 controls the actuating coils of the several line switches and accelerating switches described in connection with the main circuits of Fig. 1. The details of the circuits and the sequence of operation of the several switches will be hereinafter described in connection with the operation of the system.

The circuits controlled by the several push-button switches are illustrated in Fig. 5. While, in general, the circuits controlled by the master switch and the push-button switches are separate and independent, certain of the controlling switches are governed in common by the respective controlling devices, as will hereinafter appear.

In the "off" or illustrated position of the master-switch 22, a circuit, which is completed by the master switch, extends from the positive side of a control switch 25, through contact segments 26 and 27, actuating coil 28 of a low-voltage relay 29, resistor 30, overload relay 31, conductor 32, "stop" push button 33 (Fig. 5) and emergency switch 34, to the negative side of control switch 25. This circuit supplies energy to the several control circuits that are completed by the corresponding electrically-connected contact segments of the controller. The low-voltage relay 29 connects the positive side of the switch 25 to the several connected segments throughout the operation of the controller except in the case of failure of voltage or the operation of the overload relay 31 or other emergency devices to be hereinafter described.

To start the motor, the master-switch 22 is actuated to position $a$. A contact segment 36 engages a contact finger 37 to complete a circuit which extends from the positive side of switch 25, which is connected to a source of energy, through the several contact segments immediately above the contact segment 36, contact finger 37, conductor 38, actuating coil 39 of switch 15 and conductors 40 and 41, to the negative side of the switch 25. Slightly subsequent to the completion of the circuit above traced, a second circuit is completed which extends from contact segment 44, through contact finger 45, actuating coil 46 of line switch 12 and conductors 40 and 41, to the negative side of control switch 25. The energization of actuating coils 39 and 46 effect the closing of switches 15 and 12, respectively, to complete the armature circuit of the motor and to connect the motor across line conductors 1 and 2. The motor connections are now arranged for operation of the motor at the lower voltage obtainable from the 3-wire source of energy.

A third circuit, which is completed in the first position of the controller, extends from contact segment 49, through contact finger 50, conductor 51, actuating coil 52 of relay 20, resistor 53 and conductors 42 and 41, to the switch 25. The relay 20 closes to complete a shunt circuit for a field resistor 18 that is in series with the shunt field-magnet winding 6 and thus insure a strong field at the instant of starting the motor.

Current now traverses the motor circuit which extends from line conductor 1, through reversing switch 14, switch 15, armature 4, series field-magnet winding 5, starting resistor 7, and switch 12, to line conductor 2. The motor is thus started by the application of the lower voltage, with the starting resistor in circuit and with the field excited to a maximum degree.

When the master switch occupies position $b$, a circuit is completed which extends from contact segment 54, through contact finger 55, conductor 56, portions of which are shown in Figs. 4 and 5, "fast" push-button switch 57, Fig. 5, conductor 58, interlock 59, actuating coil 60 of switch 8, overload relay 61 and conductors 62, 42 and 41, to switch 25.

The switch 8 then closes to shunt a section of the starting resistor 7. When the current traversing the motor circuit falls to a predetermined value, a current-limit interlock 63, which is mechanically connected to the switch 8, closes to complete a circuit which extends from the positive side of switch 25 through low voltage relay 29, interlock 63, actuating coil 64 of switch 9 and conductors 42 and 41 to the other side of switch 25.

The switch 9 then closes to complete a shunt circuit for a second section of the starting resistor 7. An interlock 66, which is mechanically connected to the switch 9, completes a circuit which extends from contact segment 54, through contact finger 55, conductor 56, "fast" push-button switch 57, conductor 58, interlock 66, actuating coil 67 of switch 10, and conductor 65, to the negative side of the switch 25. The switch 10 then closes to shunt the entire starting resistor 7.

The closing of switch 10 effects the opening of an interlock 69 that is mechanically connected thereto, and the latter opens a holding circuit for the actuating coil 52 of relay 20. The relay 20 opens to remove the shunt circuit for the field resistor 18 to permit the insertion of the latter in the field circuit upon the further operation of the controller. The closing of switch 10 effects the closing of an interlock 70 to complete a holding circuit for the actuating coil 67 that is independent of the interlock 66. The interlock 59, which opens upon the closing of switch 10, opens the circuits of coils 60 and 64 of switches 8 and 9, respectively, and the latter accordingly opens.

When the master switch is actuated through positions $c$, $d$, $e$, $f$, $g$, the contact segments 72 successively engage coacting contact fingers 73 to gradually insert the resistor 18 in circuit with the shunt field-magnet winding 6 and thus further accelerate the motor. When the master switch occupies position $g$, the motor is operating at its maximum speed at the lower voltage.

When the master switch leaves position $g$, the circuit of actuating coil 46 of switch 12 is opened at contact segment 44. The switch 12 opens to disconnect the motor from line conductor 2. The circuit of actuating coil 67 of switch 10 is opened at contact segment 54. The switch 10 opens to insert the starting resistor 7. A contact segment 74 engages contact finger 50 to complete a circuit for the actuating coil 52 of field relay 20, this circuit being similar to that traced above in connection with contact segment 49. The field relay 20 again closes to shunt the resistor 18 and thereby insure a strong field for the motor upon its connection to the source of high voltage.

When the master switch occupies position $h$, a contact segment 75 engages contact finger 76, and the circuit, which is thereby completed, extends, through conductor 77, relay 78, actuating coil 79 of switch 13 and conductors 40 and 41, to the negative side of switch 25. The switch 13 then closes to connect the motor to line conductor 3, and the maximum voltage of the 3-wire system is applied to the motor, with the circuits of the latter arranged in accordance with initial starting conditions.

An interlock 81, which is mechanically connected to switch 13, closes a circuit which extends from the positive side of switch 25, through low-voltage relay 29, interlock 81, actuating coil 82 of a relay 83, resistor 84 and conductors 42 and 41, to the other side of switch 25. The relay 83 then closes to complete a shunt circuit for a portion of the circuit for controlling the accelerating switches to prevent the opening of the latter to insert the starting resistor 7 when the master switch is actuated to change the motor connections from the higher voltage to the lower voltage. The insertion of the starting resistor at such period is undesirable.

The successive operation of accelerating switches 8, 9 and 10, in the manner described in connection with the low-voltage connections, is initiated by the engagement of contact segment 85 with contact finger 55. The relay 20 is opened by the same means as that described above to remove the shunt circuit of the field resistor 18. The motor is thus accelerated to its maximum speed at the higher voltage by the successive actuation of the master switch to its final operating position $k$.

If, in case of emergency or for other reasons, it is desired to operate the motor at slow speed, a "slow" push-button switch 86 is depressed. The "fast" push-button switch 57, which is mechanically connected thereto, is opened to break the circuit of actuating coil 67 of switch 10 and the latter opens to insert the starting resistor in circuit with the motor armature. The opening of switch 10 effects the closing of interlock 69 to complete a circuit for the actuating coil 52 of relay 20, and the latter closes to insert the field resistor 18 in the field circuit of the motor.

The "slow" push-button switch 86 completes a circuit that extends from conductor 56 which is connected to the positive side of switch 25, through switch 86, conductor 87, actuating coil 88 of a relay 89, which may be termed a "slow-speed relay", and resistor 90, to switch 25. The coil 88 is energized to effect the opening of relay 78 and thereby open the circuit of actuating coil 79 of switch 13. The switch 13 opens to disconnect the motor from a source of higher voltage.

The relay 89 closes to complete a circuit for the actuating coil 46 of switch 12 and the latter closes to connect the motor to the source of lower voltage. The motor then operates at its minimum speed, since the entire starting resistor is in series with the motor armature, and the motor field is at maximum strength.

To operate the motor at its maximum operating speed, the "fast" push-button switch 57 is depressed. The "slow" push-button switch, which is mechanically connected to the "fast" push-button switch, is actuated to open the circuit of actuating coil 46 of switch 12, and the "fast" push-button switch completes the circuit of the actuating coil 79 of switch 13. The operation of the "fast" push-button switch also initiates the operation of the series of accelerating switches 8, 9 and 10 in a manner similar to that described above. The relay 20 operates, in the manner described above in connection with the accelerating switches, to remove the shunt circuit for the field resistor 18. The motor is thus connected to the source at the higher voltage, with the starting resistor shunted and the field weakened. The motor is thus quickly restored to its normal operating speed.

It will be noted that, under the conditions described above, the normal speed was varied from the normal operating speed to the minimum operating speed by a simple actuation of a push-button switch. The operation of the push-button switch for restoring normal operating conditions effected the acceleration of the motor automatically to the normal operating speed. In case the master switch is adjusted to such position as to connect the motor to the source for operation at the lower voltage, the sequence of operation is similar to that described above except that, upon the actuation of the "fast" push-button switch, the conditions corresponding to the adjustment of the master switch are restored.

In case the motor is operating at its normal speed and the "stop" push-button switch is actuated, the latter effects the opening of the circuit of the actuating coil 28 of low-voltage relay 29, and the latter opens to de-energize all of the control circuits. As a result, all of the switches open, the motor is disconnected from the line, and the switch 16, which is connected to switch 15, completes a dynamic-braking circuit for the motor armature, and the motor is quickly brought to rest.

The motor may be started without the operation of the master switch to its "off" position by depressing the "start" push-button switch 92. The deënergizing of the control circuits referred to above restores initial starting conditions in that the starting resistor 7 is in circuit with the motor armature. Upon the closing of push-button switch 92, a circuit is completed which extends from the positive side of switch 25 through push-button switch 92, conductor 93, actuating coil 28 of low-voltage relay 29, resistor 30, overload relay 31, push-button switch 33 and emergency switch 34 to the negative side of switch 25. The low-voltage relay 29 closes to effect the energization of such control circuits as are completed by the master switch in the position to which it may be adjusted. The switch 15 and the corresponding switch 12 or 13, as the case may be, are closed to complete the connection of the motor to the source. The accelerating switches operate in order to remove the starting resistor, and the relay 20, which is closed upon the operation of low-voltage relay 29, opens to insert the field resistor 18.

When the master switch is returned from its normal operating position toward its "off" position, the field resistor is gradually shunted to strengthen the field of the motor. When the master switch leaves position $h$, the switch 13 opens and the switch 12 closes, as will be readily understood. The circuit of the actuating coil 67 of accelerating switch 10, which is controlled by contact segment 84, is opened at the latter but the circuit is maintained through the relay 83, and the resistor 7 is shunted until subsequent to the opening of switch 12.

The further actuation of the master switch toward its "off" position effects the insertion of the field resistor 18 to weaken the field at the instant of transition from one voltage to another and to gradually shunt the field resistor as the master switch approaches position $b$. When the master switch leaves position $b$, the accelerating switch 10 is opened to insert the starting resistor in series with the motor armature. When the master switch leaves position $a$, all of the several controlling switches are opened and initial conditions are restored.

It will be noted that I have provided a system which may be controlled by a master switch to vary the speed of the motor, as desired, by controlling the current traversing the motor armature and field circuits and by varying the value of the voltage applied to the motor. Suitable means are also provided whereby the motor may be controlled independently of the actuation of the master switch to vary the speed of the motor within comparatively wide limits and within a brief period of time. The push-button switches operate to reduce the speed of the motor from any speed for which the master switch may be adjusted to the minimum operating speed and to increase the speed of the motor from the minimum speed to the speed corresponding to the position of the master switch. The motor may also be brought to rest and started by means of the push-button switches, providing, however, that the master switch has been previously adjusted to one of its operative positions.

The slow-speed relay, which is controlled by certain of the push-button switches, determines the value of the voltage that is applied to the motor by controlling the corresponding main switches.

A second relay operates, when the speed of the motor is increased by applying the higher voltage, to complete a shunt circuit for a portion of the circuit for controlling the accelerating switches and thus prevents the insertion of the starting resistor when the transition from the higher to the lower voltage is effected by returning the master switch toward its "off" position.

I claim as my invention:

1. The combination with a source of energy and an electric motor, of means for gradually accelerating said motor when the value of the applied voltage is substantially constant and for varying the value of the voltage applied thereto, and means operable independently of said controlling means for effecting a reduction in the value of the voltage applied to said motor and a relatively quick deceleration of said motor.

2. The combination with a source of energy and an electric motor, of means comprising a master switch for effecting the gradual acceleration of said motor at a given value of applied voltage, and for effecting a variation in the value of the voltage applied thereto, and a plurality of switches manually operable independently of said master switch for respectively effecting relatively quick deceleration and acceleration of said motor and correspondingly varying the value of the voltage applied thereto.

3. The combination with a multi-voltage source of energy, and an electric motor, of means for selectively controlling the voltage applied to said motor and for effecting the gradual acceleration of said motor at any applied voltage, and means operable independently of said controlling means for effecting the variation of the speed of said motor from that for which the controlling means is adjusted to a minimum rate and for effecting an increase in the speed of said motor to that for which the controlling means is adjusted.

4. The combination with a multi-voltage source of energy and an electric motor, of a plurality of accelerating switches, a master switch for effecting the operation of said switches upon the application of voltage of the respective values, an additional switch for controlling said accelerating switches, and means for preventing the opening of one of said accelerating switches when the value of the voltage is reduced.

5. The combination with a multi-voltage source of energy and an electric motor, of a plurality of accelerating switches, a master switch for effecting the operation of said switches upon the application of voltage of the respective values, an additional switch for controlling said accelerating switches, and means for preventing the opening of one of said accelerating switches when the value of the voltage is reduced, said means comprising a relay for controlling a holding circuit for the actuating coil of said accelerating switch.

6. The combination with a multi-voltage source of energy and an electric motor, of an accelerating switch, line switches for connecting said motor to said source to vary the applied voltage, a master switch for successively effecting the closing of said accelerating switch, the opening of one of said line switches and of said accelerating switch, the closing of a second line switch and the closing of said accelerating switch, and means comprising a relay for maintaining the closure of said accelerating switch when the master switch is actuated in the opposite direction to vary the applied voltage.

7. The combination with a multi-voltage source of energy and an electric motor, of means comprising a pair of line switches for connecting said motor to said source for operation at different voltages, a relay for controlling said line switches, a master switch for controlling said line switches, and a switch for controlling said relay.

8. The combination with a multi-voltage source of energy and an electric motor, of means comprising a pair of line switches for connecting said motor to said source for operation at different voltages, a relay for controlling said line switches, a master switch for controlling said line switches, and a pair of push-button switches for controlling said relay to selectively control said line switches and thereby vary the value of the voltage applied to said motor.

In testimony whereof, I have hereunto subscribed my name this 16th day of January 1920.

REESE T. KINTZING.